US012686730B2

(12) United States Patent
Koksal

(10) Patent No.: US 12,686,730 B2
(45) Date of Patent: Jul. 21, 2026

(54) METHOD FOR OBTAINING PLASTIC ADMIXTURE MATERIAL AND BIOPLASTIC MATERIAL FROM BREAD WASTE

(71) Applicant: Hatice Busra Koksal, Istanbul (TR)

(72) Inventor: Hatice Busra Koksal, Istanbul (TR)

( * ) Notice: Subject to any disclaimer, the term of this patent is extended or adjusted under 35 U.S.C. 154(b) by 530 days.

(21) Appl. No.: 18/264,880

(22) PCT Filed: Feb. 15, 2022

(86) PCT No.: PCT/TR2022/050128
§ 371 (c)(1),
(2) Date: Aug. 9, 2023

(87) PCT Pub. No.: WO2022/177533
PCT Pub. Date: Aug. 25, 2022

(65) Prior Publication Data
US 2024/0052066 A1     Feb. 15, 2024

(51) Int. Cl.
*C08B 31/00*     (2006.01)
*C08L 3/02*     (2006.01)

(52) U.S. Cl.
CPC ................ *C08B 31/00* (2013.01); *C08L 3/02* (2013.01); *C08L 2201/06* (2013.01)

(58) Field of Classification Search
CPC .................................. C08B 31/00; C08L 3/02
USPC ........................................................ 523/128
See application file for complete search history.

(56) References Cited

U.S. PATENT DOCUMENTS

| | | | |
|---|---|---|---|
| 10,988,599 B2 | 4/2021 | Yang | |
| 2020/0247979 A1* | 8/2020 | Yang | C08L 3/04 |
| 2021/0179737 A1 | 6/2021 | Yilmaz et al. | |

FOREIGN PATENT DOCUMENTS

| | | | |
|---|---|---|---|
| TR | 201315119 | 12/2013 | |
| TR | 201906799 A2 | 11/2020 | |
| WO | WO-2004101185 A1 * | 11/2004 | B02C 18/12 |

OTHER PUBLICATIONS

Tsang et al., Production of bioplastic through food waste valorization, 2019, Elsevier, pp. 625-644 (Year: 2019).*

Bahattin Özdemir, "Dişarda Yemek Yeme Olgusu: Kuramsal Bir Model Önerisi [Eating Out: A Theoretical Model Proposal]", Anatolia: Turizm Aratrmalar Dergisi [Anatolia: Journal of Tourism Studies], vol. 21, No. 2, Fall 218-232, 2010.
Jarle Marthinsen et al., "Prevention of food waste in restaurants, hotels, canteens and catering", 2012.
Kate Parizeau et al., "Household-level dynamics of food waste production and related beliefs, attitudes, and behaviours in Guelph, Ontario", Waste Management, 35 (2015) 207-217.
Luis F. Marmolejo et al., "Perspectives for Sustainable Resource Recovery from Municipal Solid Waste in Developing Countries: Applications and Alternatives", Waste Management—An Integrated Vision, chapter 7, pp. 153-166, 2012.
Mustafa Yücel et al., "çevre Dostu Ürün Kavramina Bütünsel Yaklaşim; Temiz Üretim Sistemi, Eko-Etiket, Yeşil Pazarlama [A Study About Environmentally Products: System of Clean Production, Eco-Label and Green Marketing]", Elektronik Sosyal Bilimler Dergisi [Electronic Journal of Social Sciences], V.7 N. 26, Autumn 2008.
International Search Report of PCT/TR2022/050128 mailed on Aug. 12, 2022.
Immonen, Mikko et al., "Waste bread recycling as a baking ingredient by tailored lactic acid fermentation", International Journal of Food Microbiology, vol. 327, May 4, 2020 (May 4, 2020).
Lam, Koon Fung et al., "Economic feasibility of a pilot-scale fermentative succinic acid production from bakery wastes", Food and Bioproducts Processing, vol. 92, No. 3, Jul. 1, 2014 (Jul. 1, 2014), pp. 282-290.
Tsang, Yiu Fai et al., "Production of bioplastic through food waste valorization", Environment International, vol. 127, Apr. 13, 2019 (Apr. 13, 2019), pp. 625-644.
Creedon, Mairead et al., Less Food Waste More Profit: A guide to Minimising Food Waste in the Catering Sector, 2010.

* cited by examiner

*Primary Examiner* — Deve V Hall
(74) *Attorney, Agent, or Firm* — Rabin & Berdo, P.C.

(57)     ABSTRACT

In the relevant technical field, cellulose-based wastes or agricultural wastes are used as raw materials in the production of environmentally friendly bioplastics or plastic admixture materials. The cost spent on a product is high to recycle agricultural wastes into these said final products. In addition, cellulose-based raw materials such as olive seeds are not as suitable for polymerization as starches. In this context, in the invention, starch-based bread waste is used as a raw material for the production of bioplastics and plastic admixture materials. The bread wastes are more suitable for polymerization, and when used as raw material, the product price per unit time is more economical compared to other agricultural or waste foodstuffs.

14 Claims, 6 Drawing Sheets

METHOD FOR OBTAINING PLASTIC ADMIXTURE MATERIAL AND BIOPLASTIC MATERIAL FROM BREAD WASTE

TECHNICAL FIELD

The invention relates to the production of a sustainable plastic admixture material and bioplastic material from waste bread, wherein less harmful and waste materials for nature can be evaluated.

PRIOR ART

The desire to produce more and become rich, which started with the placing of science at the disposal of production, causes the resources to be used as if they will never run out. However, the production wastes and consumption wastes obtained as a result of this production frenzy has started to pollute the atmosphere, seas, rivers and land parts on an international scale (Marmolejo et al., 2012; Yücel and Ekmekçiler, 2008).

Until the 20th century, since the use of plastic was low and plastic waste was not high, it did not pose a great danger to living things and was not perceived as an environmental problem. Since the 20th century, with the widespread use of plastic and the increase in plastic waste, it has begun to pose a danger to all living things, especially humans, and the environment.

Plastic waste, which is increasing day by day due to the use of plastic, has started to be seen as a big problem due to the damage to all living things and the environment. For this reason, the production of more environmentally friendly equivalent products that can be biodegraded in nature more easily and replace the existing plastics has started to form the basis of the study subjects.

The largest sector in which food a lot of waste are generated is the food and beverage sector (Creedon et al., 2010). Food and beverage industry has become one of the largest sectors not only in the world, but also in our country, due to its contribution to the economy and the employment opportunities it creates (Özdemir, 2010). Many countries, institutions and civil society organizations conduct studies on food waste, which has become a global problem. Waste disposal of food wastes causes environmental, economic and ethical problems (Parizeau, Massow and Martin, 2015; Marthinsen et al. 2012). Only in Turkey, approximately 5 billion pieces of bread are not reused as waste per year. For this reason, studies on the evaluation of food wastes in sustainable production methods and thus bringing back into the economic cycle continue at full speed around the world.

The subject of the invention with application number TR 2019/06799 is directed to the production of bioplastics from waste olive seeds (pomace). Processes performed in the present invention are directed to olive seeds. In this invention, it is ensured that the cellulose in the olive seed is separated, polymerization is carried out and bioplastic material is obtained.

The invention with application number TR 2013/15119 is directed to the production of bio-ethanol from waste bread.

The invention numbered US 201816101435 is directed to the production of bioplastics from pumpkins. Accordingly, the invention includes some embodiments in order to obtain bioplastic from pumpkin.

There are many studies on the evaluation of many waste products in the relevant technical field. One of these studies is the production of bioplastics from agricultural or food waste. Although bioplastics can be obtained from many different waste raw materials, the owners of the studies have doubts about their commercialization and cost-effective production (the rush to make a profit).

It is possible to include the waste breads in the sustainable production method, and thus to provide the production of both low-cost raw material and the production of more environmentally friendly plastic. As a result, it is thought that some regulations and innovations should be brought to the relevant technical field in order to make it possible to obtain more environmentally friendly plastic materials from waste bread.

SUMMARY OF THE INVENTION

The present invention relates to the production method of a bioplastic and/or plastic admixture material in order to eliminate the above-mentioned disadvantages and to bring new advantages to the related technical field.

An object of the invention is to reveal a production method for obtaining bioplastic or plastic admixture material from bread waste.

An object of the invention is to provide the production of an environmentally friendly (degradable in nature in a short time) plastic admixture material and bioplastic for the relevant technical field.

The invention relates to the production method of bioplastic and/or plastic admixture material. Accordingly, the production method includes the following process steps;
- cutting bread waste by slicing and allowing to dry,
- bringing the bread wastes into powder form by grinding process after the drying process,
- obtaining waste bread powder:water mixture by adding water to bread waste in powder form and dissolving,
- adding HCl with a concentration of at least 30% to the waste bread powder:water mixture,
- by adding HCl, releasing the starches in the powdered bread waste, and then by adding glycerin, achieving the polymerization, and obtaining the mixture containing bio-raw material,
- adding NaOH neutralizing the mixing medium,
- adding sodium metabisulphite-water solution to the mixture and then allowing the mixture to dry,
- reducing the dimension of the dried bio-raw material by grinding,
- mixing the resulting bio-raw materials by subjecting to the twin screw extruder process and adding maleic anhydride and an antioxidant as an additional component and obtaining bioplastic as a result of the processes.

In this way, it is ensured that the production of an environmentally friendly (degradable in nature in a short time) plastic admixture material and bioplastic is carried out for the relevant technical field.

In the possible embodiment of the invention, the said production method includes the following process steps;
- Mixing powdered bread waste in water at a value between 1/1 and 2/1 (w/v) (g/mL),
- adding HCl with a concentration of at least 30% at a value between 1/10 (v/v) and 7/10 (v/v) to the resulting powdered bread waste:water mixture,
- adding glycerine to the mixture in a value between 2/10 (v/v) and 15/10 (v/v) of the water amount,
- adding a NaOH solution at a ratio between 2/10 (v/v) and 7/10 (v/v) in the mixture,
- adding sodium metabisulphite solution to the bio-raw material mixture at a value between 1/10 and 5/10 of the amount of added water, allowing the mixture to dry for 24 to 72 hours,
    subjecting the bio-raw material to the double extruding
        process at a maximum temperature of 250° C. and
        obtaining bioplastic by adding 0.5-2% of maleic anhy-
        dride and 0.5-2% of antioxidant from the side feeder
        during the process.

In the possible embodiment of the invention, it is char-
acterized in that the waste bread powder:water mixture is
between 1.2:1 and 1.8:1 (g:mL). After this process, the
bonds in the powdered bread waste are broken and the starch
is released. In the possible embodiment of the invention, it
is characterized in that the waste bread powder:water mix-
ture is 1.5:1 (g:mL).

In a possible embodiment of the invention, said HCl is
added to the waste bread powder:water mixture at a ratio
between 2:10 (v:v) and 7:10 (v:v). After this process, the
bonds in the powdered bread waste are broken and the starch
is released.

In the possible embodiment of the invention, it is char-
acterized in that the amount of said glycerin is added to be
between 4:10 (v:v) and 12:10 (v:v) of the amount of water
in the mixture. In this way, the polymerization process of the
mixture is provided.

In the possible embodiment of the invention, the amount
of said NaOH is between 4:10 (v:v) and 6:10 (v:v) in the
mixture.

In the possible embodiment of the invention, the said
drying process is carried out for 48 hours.

DETAILED DESCRIPTION OF THE INVENTION

Figure 1:
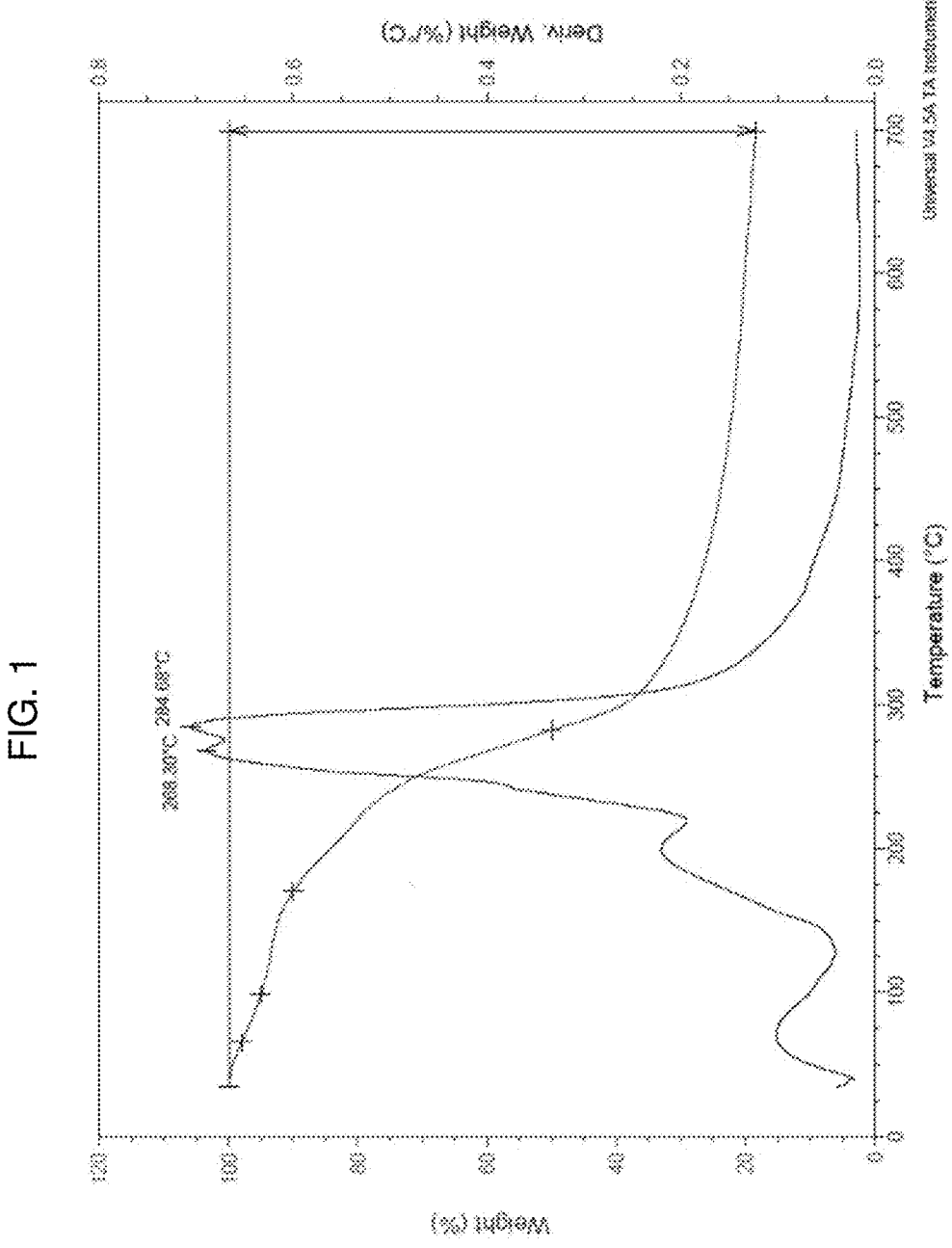
FIG. 1 shows the reference polypropylene TGA graph
compared with the bioplastic and/or plastic admixture mate-
rial of the invention.

In this detailed description, the subject of the invention
relates to a production for obtaining bioplastic or plastic
admixture material from bread waste; and it is only
explained with examples that will not have any limiting
effect only for a better understanding of the subject.

The term environmentally friendly is used as "quickly
degradable in nature (dissoluble) and non-toxic effect".

In the relevant technical field, cellulose-based wastes or
agricultural wastes are used as raw materials in the produc-
tion of environmentally friendly bioplastics or plastic admixture materials. In general, since the amount of prod-
ucts obtained as a result of the processes of these cellulose-
based and agricultural wastes is low, the cost per product is
high. In addition, cellulose-based raw materials such as olive
seeds are not as suitable for polymerization as starches. In
this context, in the invention, starch-based bread waste is
used as a raw material for the production of bioplastics and
plastic admixture materials. The bread wastes are more
suitable for polymerization, and when used as raw material,
the product price per unit time is more economical compared
to other agricultural or waste foodstuffs.

As mentioned before, the subject of the invention relates
to the production of bioplastics and/or plastic admixture
materials from bread waste; and it includes the following
process steps;
    cutting bread waste by slicing and allowing to dry,
    bringing into powder form after drying process,
    obtaining a mixture by adding water to the powder form
        and dissolving,
    adding at least 30% concentration of HCl to the mixture,
    ensuring polymerization by adding glycerine, obtaining
        the bio-raw material mixture,
    adding NaOH neutralizing the mixing medium,
    adding sodium metabisulphite-water solution to the mix-
        ture and then allowing the mixture to dry,
    reducing the dimension of the dried bio-raw material by
        grinding.

Here, due to the slicing of bread waste, the drying process
is accelerated and the surface area is expanded so that the
starch can be separated more easily. The powdering of bread
waste is also directed to the same purpose; and it is an issue
to take into account that the powder form is not exposed to
moisture in any way.

The bread wastes brought into powder form are mixed in
water for the next processes. Said waste bread powder:water
solution is adjusted to a value between 1:1 and 2:1 (w:v)
(g:mL). Preferably, the waste bread powder:water mixture
has a value between 1.2:1 and 1.8:1 (g:mL), most particu-
larly the waste bread powder:water solution is 1.5:1.

The resulting bread powder:water mixture is treated with
HCl at a concentration of at least 30% and at most 90% at
room temperature. After this process, the bonds in the
powdered bread waste are broken and the starch is released.
The said HCl concentration is preferably between 30% and
32%. The amount of HCl is added to the mixture such that
the amount of water added to the mixture is between 1:10
(v:v) and 7:10 (v:v). For example, for 100 mL of water, a
minimum of 10 mL of HCl and a maximum of 70 mL of HCl
are added. Preferably, this ratio is between 2:10 (v:v) and
7:10 (v:v). In particular, this ratio, namely the amount of
HCl added, is half the amount of water in the mixture.

Glycerin, which is frequently used in the art, is added to
the resulting mixture to ensure polymerization. The amount
of glycerin can also be added based on the amount of water.
Accordingly, glycerin is added to the mixture at a value
between 2:10 (v:v) and 15:10 (v:v) of the amount of water.
Preferably, the amount of glycerin is between 4:10 (v:v) and
12:10 (v:v) of the amount of water in the mixture. Prefer-
ably, the amount of glycerin is equal to the amount of water.

NaOH is added to the mixture after completion of polym-
erization to neutralize the mixture medium. The NaOH
concentration is between 90% and 99%. The solution is
added by adding the amount of NaOH with a concentration
between 90% and 99% to the water. Accordingly, a NaOH-
water solution is provided by adding 50 g of NaOH to 100
mL of water. The amount of said NaOH-water solution is added to the mixture and its ratio is 2:10 (v:v) to 7:10 (v:v). Preferably, this ratio is between 4:10 (v:v) and 6:10 (v:v).

Sodium metabisulphite-water solution [(1:2) (g:mL)] is added to the resulting bio-raw material to prevent from decaying. Said sodium metabisulphite solution is added to the bio-raw material mixture at a value between 1:10 and 5:10 of the amount of water added.

The drying process preferably takes between 24 and 72 hours. This processing time may vary depending on the amount of the product. This process is performed at room temperature.

The resulting product is used as a bio-raw material and then can be used in the production of biopolymer material by placing in the double extruder machine. While making the biopolymer material, maleic anhydride, antioxidant and/or silane are supplied from the feeding part together with the bio-raw material. Twin screw extruding process is performed at a maximum temperature of 250° C.

The amount of maleic anhydride is added in the twin screw extruder at a value between 0.5% and 2% by weight, based on the amount of bio-raw material.

One of the antioxidant materials can be added at a value of 0.5% to 2% to prevent the bio-raw material from burning in the double extruder process.

The bio-raw material obtained in the invention can act as an admixture material in the production of polymer material by the double extruder process. Here, polymers such as PE, PP, PET, PS can be used as a raw material source.

The bio-raw material is obtained by applying the said process steps. The bio-raw material can be used as plastic admixture material or bioplastic material together with other mixing materials.

The bioplastic material can be obtained by processing the resulting bio-raw material in the double extruder process. Here, at least one of the double extruder antioxidant, maleic anhydride and/or silane is added as admixture material together with the bio-raw material.

The invention is directed to obtaining bio-raw material by first obtaining starches from bread waste and then polymerizing the resulting starches. The present invention includes some embodiments for providing biopolymer raw materials from bread waste.

With the use of bread waste as raw material, only about 5 billion wastes per year can be prevented. It is thought that the invention will contribute to the inventions and studies related to the prevention of food waste, and the regaining of wastes to the economy with the sustainable production method.

The use of starches for polymerization from bread waste provides a different advantage. The bioplastic materials are obtained from some of the foods available in the art by polymerization of lactic acid or celluloses; their polymerization is not as high as the starch in bread waste. In this way, it is possible to obtain more bioplastic material than the unit amount of bread waste. As such the bread waste is a raw material with a lower cost than the bioplastic raw materials available in the art. In addition, the efficiency of the processes of obtaining bioplastic material from bread waste is much higher than the efficiency of other processes available in the art. For example, by following the production method provided in the invention, 1.5 tons of bio-raw material can be obtained from 1 ton of bread waste.

The bio-raw material obtained by the method provided in the invention can be dissolved in nature in a very short time.

EXAMPLE

An exemplary application obtained with the method provided in the invention is given below. Accordingly, the production of bioplastic from bread waste is completed with the application of the following process steps.

The breads are sliced and kept until the moisture inside is completely dry. Dried breads are brought into powder.

The mixture is prepared by adding 100 ml of distilled water to 150 grams of bread.

20-70 ml of hydrochloric acid with a concentration of 30%-32% is added to the bread powder waste-water mixture.

20-150 ml of glycerine is added for the polymerization processes of the mixture.

In order to neutralize the medium, we add 50 grams of sodium hydroxide with a concentration of 99%-99.5% to 100 ml of water. Then, this liquid solution is added to the bread powder waste-water mixture at a value of 20-70 ml and bio-raw material is obtained.

In order to prevent the bio-raw material from decaying, 50 grams of sodium metabisulphite is added to 100 ml of water and 5-15 ml of this solution is added to our mixture.

Finally, the resulting bio-raw material is dried for a period of 24-72 hours.

As a result of cutting processes of dried bio-raw material, its dimensions are reduced.

The resulting bio-raw material is included in the double extruder process, and wherein the bioplastic is obtained by adding 0.5-2% of maleic anhydride at the temperatures of 180-250° C. and 0.5%-2% of antioxidants from the side feeder.

TESTS

The bioplastic product obtained with the process steps given in the example section is added to the polypropylene polymer product in certain weight ratios as an admixture material and then mechanical tests are applied.

Accordingly, 10% and 20% by weight of bioplastic polypropylene is added as an admixture component according to the mechanical test results given in Table 1. Comparisons are made between the said bioplastic-polypropylene and reference polypropylene raw material.

TABLE 1

Test results of mechanical strength of polypropylene, polypropylene containing bioplastic obtained from 10% by weight of bread waste, and polypropylene containing bioplastic obtained from 20% by weight of bread waste

| Sample Name | 10% bioplastic-PP | 20% bioplastic-PP | PP |
|---|---|---|---|
| Maximum Load | 43.3 | 41.3 | 47.29 |
| Young Modulus | 1.66 | 1.07 | 1.01 |
| Yield Strength | 0.3 | 0.3 | 0.69 |
| Breaking Strength | 16.4 | 15.92 | 45.9 |
| Elongation at Break | 3.86 | 2.84 | 4.66 |
| Elongation at Yield Strength | 5.77 | 6.22 | 4.20 |

It is seen in the mechanical test results that there has not been much change in the mechanical strength with the addition of bioplastic obtained from bread waste to the polypropylene as a component. (There are standard deviations in the test results.) It can also be seen in the test results that the bioplastic obtained from bread waste can eliminate the use of polypropylene and replace it.

Figure 2:
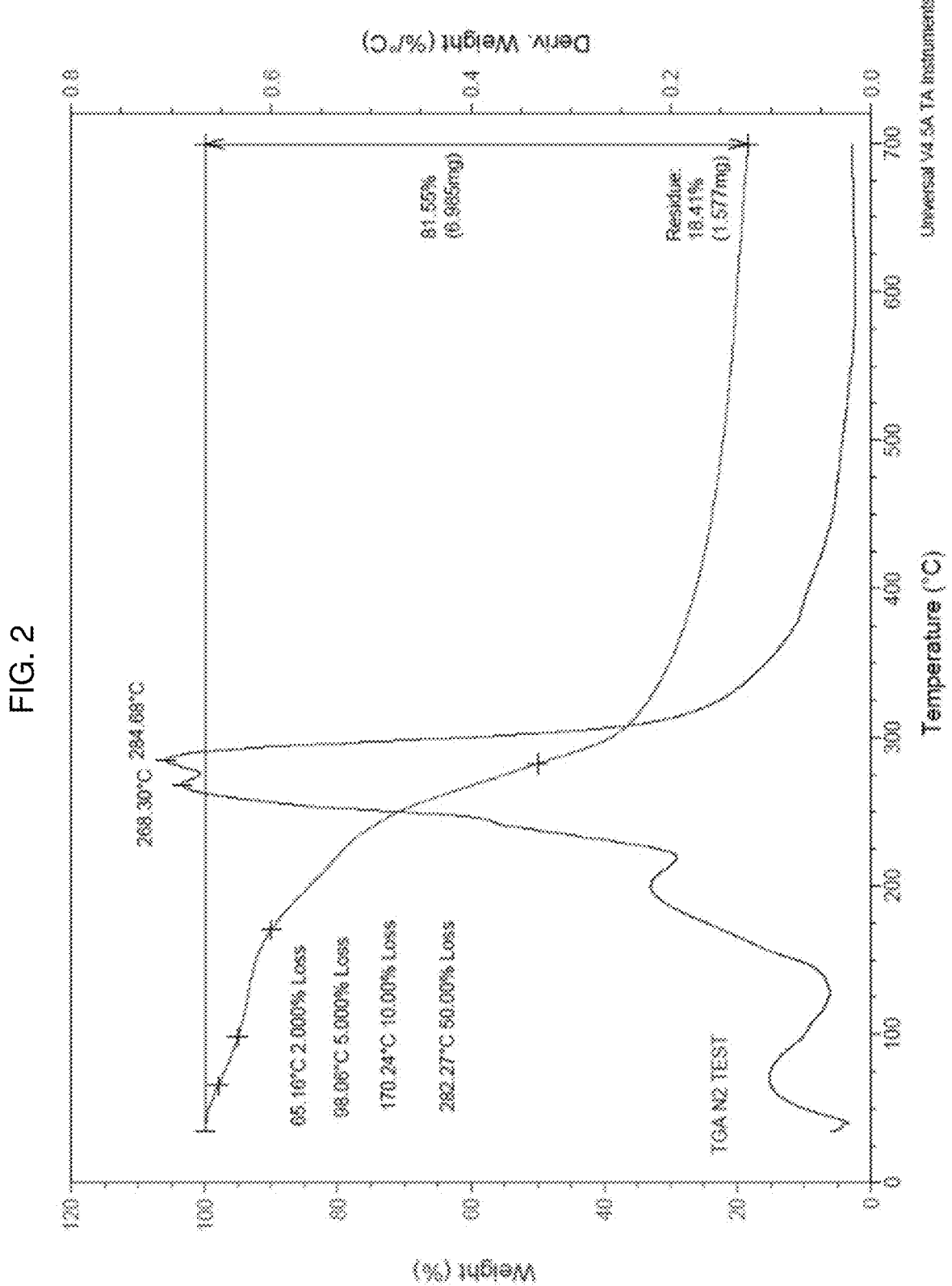
FIG. 2 shows the reference propylene DSC graph com-
pared with the bioplastic and/or plastic admixture material
of the invention.
Figure 3:
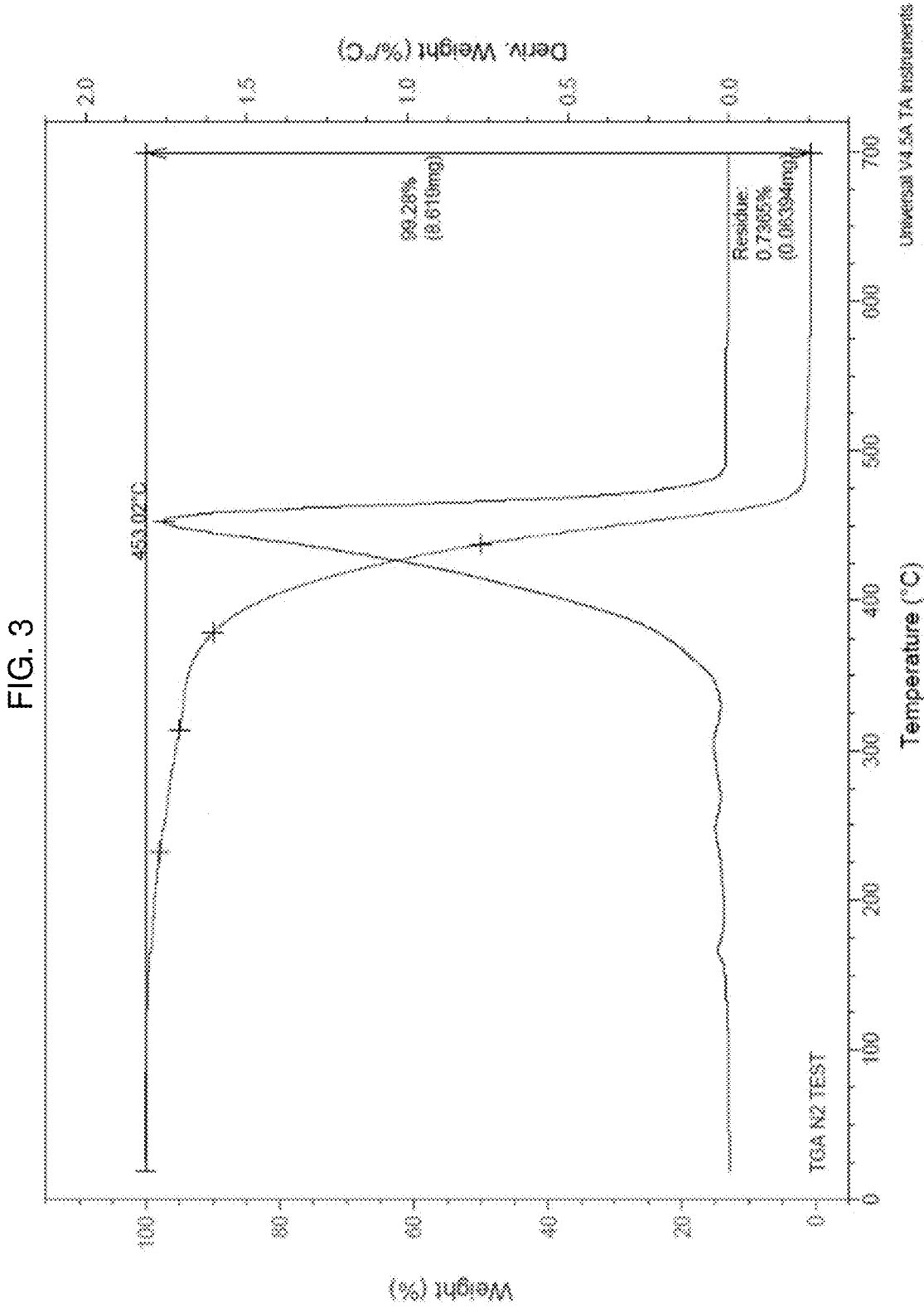
FIG. 3 shows the TGA graph of the plastic admixture
material-polypropylene, in which the bioplastic and/or plas-
tic admixture material of the invention is added at a value of
10% by weight.
Figure 4:
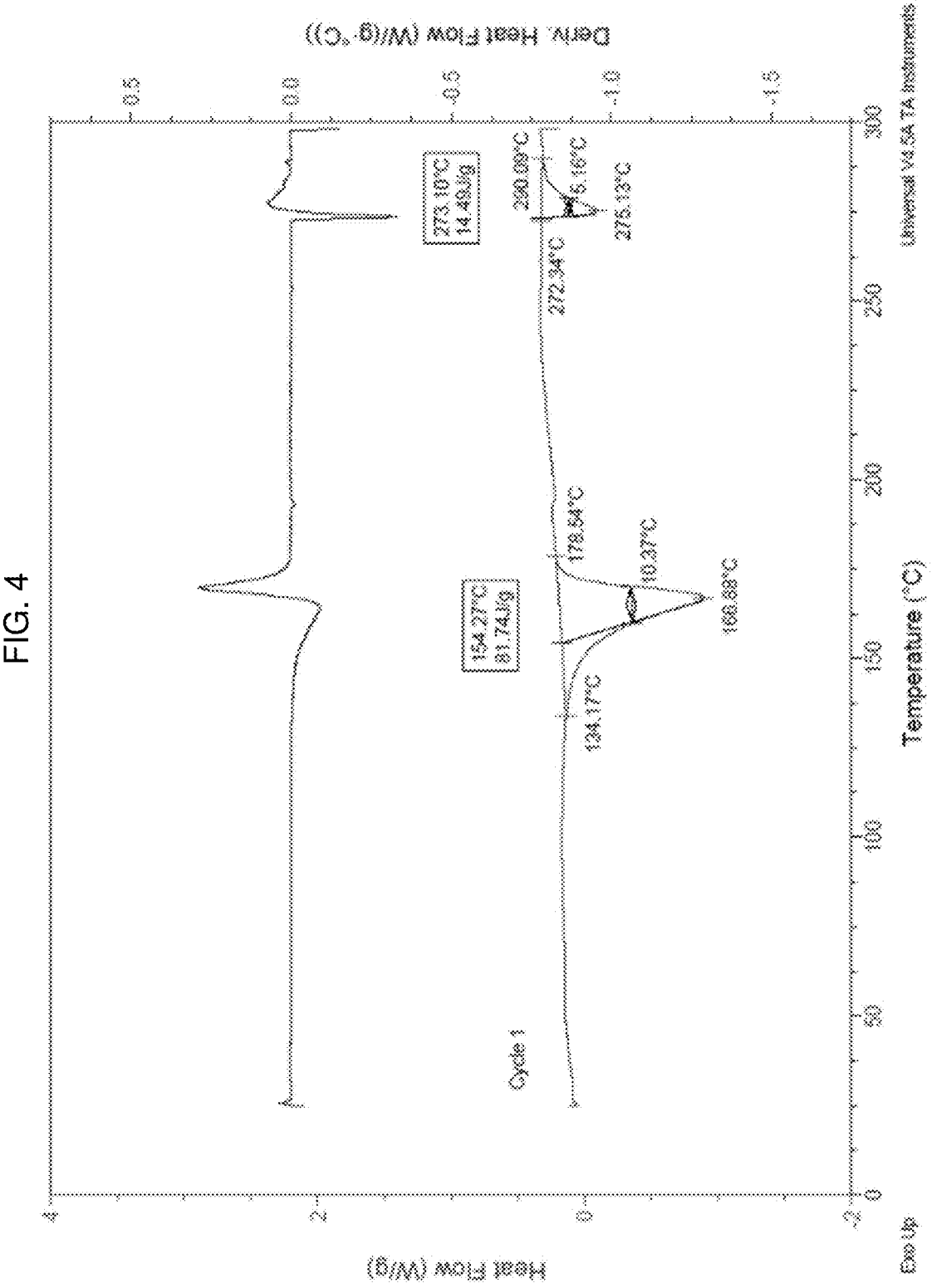
FIG. 4 shows the DSC graph of the plastic admixture
material-polypropylene, in which the bioplastic and/or plas-
tic admixture material of the invention is added at a value of
10% by weight.
Figure 5:
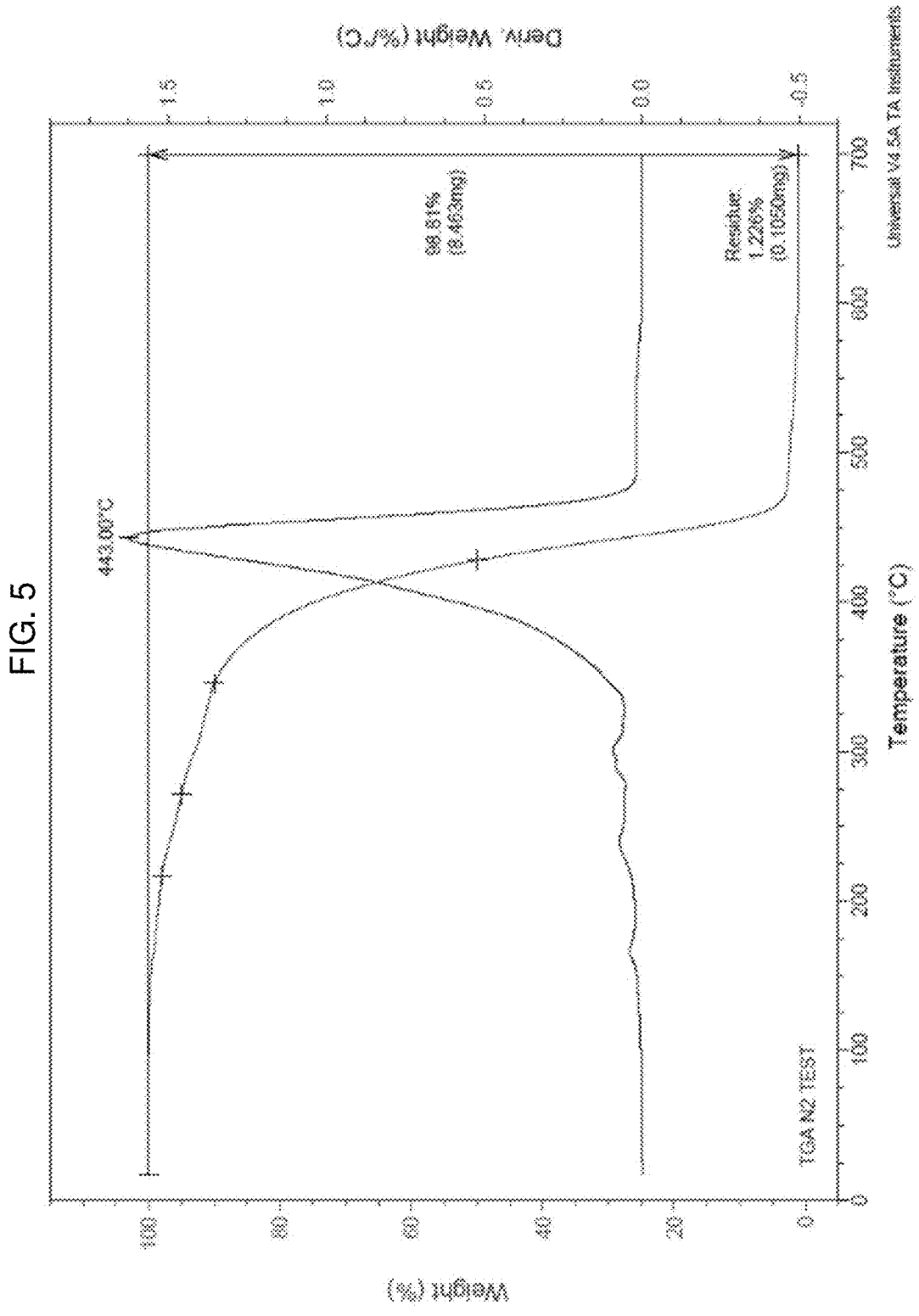
FIG. 5 shows the TGA graph of the plastic admixture
material-polypropylene, in which the bioplastic and/or plas-
tic admixture material of the invention is added at a value of
20% by weight.
Figure 6:
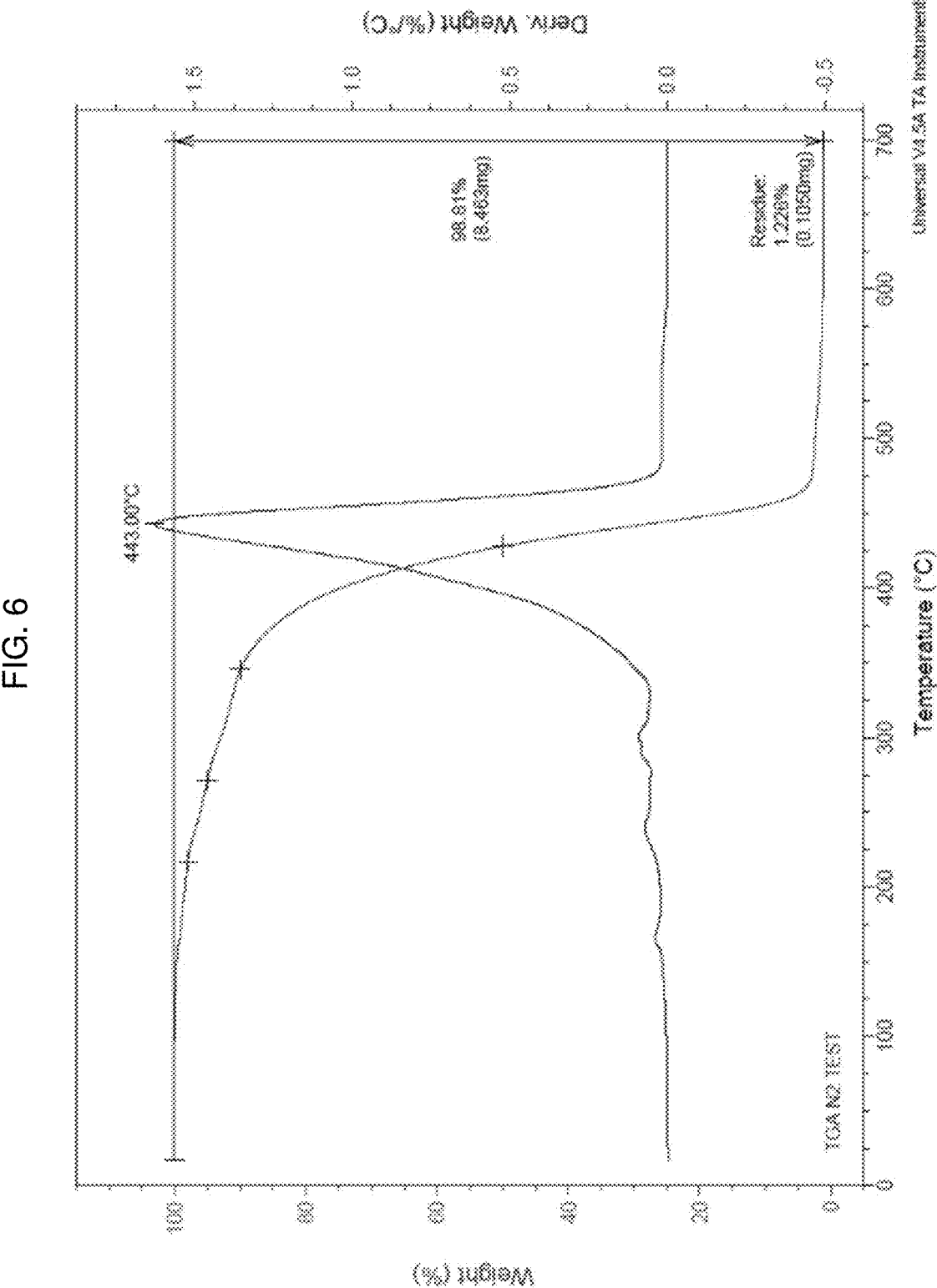
FIG. 6 shows the DSC graph of the plastic admixture
material-polypropylene, in which the bioplastic and/or plas-
tic admixture material of the invention is added at a value of
20% by weight.

TGA analysis of reference polypropylene is given in FIG. 1 and DSC analyzes are given in FIG. 2. TGA analyzes of polypropylene to which 10% by weight of bioplastic component is added are given in FIG. 3 and DSC analyzes are given in FIG. 4. TGA analyzes of polypropylene to which 20% by weight of bioplastic component is added are given in FIG. 5 and DSC analyzes are given in FIG. 6. It can be seen in the said analyzes that bioplastics are similar to polypropylene and similar polymers as raw materials and there will be no problem in adding them as an admixture component. As a result, bioplastics obtained from bread waste can be added to the polypropylene as an admixture material, and thus, the use of polymer materials as raw materials, which is known to have many disadvantages in the related technical field, can be reduced. In addition, bread waste are also brought into a sustainable economic cycle.

The scope of protection of the invention is specified in the attached claims and it cannot be limited to what is explained in this detailed description for the sake of example. It is clear that a person skilled in the art can provide similar embodiments in the light of the above, without departing from the main theme of the invention.

The invention claimed is:

1. The production method of bioplastics and/or plastic admixture materials, characterized in that it includes the process steps of;

cutting bread waste by slicing and allowing to dry, bringing the bread wastes into powder form by grinding process after the drying process, obtaining waste bread powder:water mixture by adding water to bread waste in powder form and dissolving, adding HCl with a concentration of at least 30% to the waste bread powder:water mixture, by adding HCl, releasing the starches in the powdered bread waste, and then by adding glycerin, achieving the polymerization, and obtaining the mixture containing bio-raw material, adding NaOH neutralizing the mixing medium, adding sodium metabisulphite-water solution to the mixture and then allowing the mixture to dry, reducing the dimension of the dried bio-raw material by grinding, mixing the resulting bio-raw materials by subjecting to the twin screw extruder process and adding maleic anhydride and an antioxidant as an additional component and obtaining bioplastic as a result of the processes.

2. A production method according to claim 1, characterized in that it includes the process steps of;

Mixing powdered bread waste in water at a value between 1/1 and 2/1 (w/v) (g/mL), adding HCl with a concentration of at least 30% at a value between 1/10 (v/v) and 7/10 (v/v) to the resulting powdered bread waste:water mixture, adding glycerine to the mixture in a value between 2/10 (v/v) and 15/10 (v/v) of the water amount, adding a NaOH solution at a ratio between 2/10 (v/v) and 7/10 (v/v) in the mixture, adding sodium metabisulphite solution to the bio-raw material mixture at a value between 1/10 and 5/10 of the amount of added water, allowing the mixture to dry for 24 to 72 hours, performing the twin screw extruder mixing process of the bio-raw material at a maximum temperature of 250° C. and obtaining bioplastic by adding 0.5-2% of maleic anhydride and 0.5%-2% of antioxidant from the side feeder during the process.

3. A production method according to claim 1, characterized in that the waste bread powder:water mixture is between 1.2:1 and 1.8:1 (g:mL).

4. A production method according to claim 3, characterized in that the waste bread powder:water mixture is 1.5:1 (g:mL).

5. A production method according to claim 1, characterized in that the said HCl is added at the ratios between 2/10 (v/v) and 7/10 (v/v) to the waste bread powder:water mixture.

6. A production method according to claim 1, characterized in that the said amount of glycerin is added at a value between 4/10 (v/v) and 12/10 (v/v) of the water amount in the mixture.

7. A production method according to claim 1, characterized in that the said amount of NaOH is between 4/10 (v/v) and 6/10 (v/v) in the mixture.

8. A production method according to claim 1, characterized in that the said drying process is performed for a period of 48 hours.

9. A production method according to claim 2, characterized in that the waste bread powder:water mixture is between 1.2:1 and 1.8:1 (g:mL).

10. A production method according to claim 9, characterized in that the waste bread powder:water mixture is 1.5:1 (g:mL).

11. A production method according to claim 2, characterized in that the said HCl is added at the ratios between 2/10 (v/v) and 7/10 (v/v) to the waste bread powder:water mixture.

12. A production method according to claim 2, characterized in that the said amount of glycerin is added at a value between 4/10 (v/v) and 12/10 (v/v) of the water amount in the mixture.

13. A production method according to claim 2, characterized in that the said amount of NaOH is between 4/10 (v/v) and 6/10 (v/v) in the mixture.

14. A production method according to claim 2, characterized in that the said drying process is performed for a period of 48 hours.

\* \* \* \* \*